United States Patent

[11] 3,625,248

| [72] | Inventor | Philippe Lhotellier<br>Montrichard, (Loir et Cher), France |
|---|---|---|
| [21] | Appl. No. | 882,153 |
| [22] | Filed | Dec. 4, 1969 |
| [45] | Patented | Dec. 7, 1971 |

[54] AUTOMATIC PRESSURE-EQUILIBRATING VALVES
4 Claims, 1 Drawing Fig.

[52] U.S. Cl. ............................................. 137/493.6
[51] Int. Cl. .................................................. F16k 17/18
[50] Field of Search ........................................ 137/493.6, 493.1, 493.3, 493.9

[56] References Cited
UNITED STATES PATENTS

| 1,229,885 | 6/1917 | Chadwick | 137/493.6 X |
| 1,990,516 | 2/1935 | Beckel | 137/493.6 X |
| 2,016,278 | 10/1935 | Ehlers | 137/493.6 |
| 2,133,200 | 10/1938 | Kenneweg | 137/493.3 |
| 2,139,395 | 12/1938 | Walker | 137/493.6 X |
| 2,406,502 | 8/1946 | Lines | 137/493.1 X |
| 2,492,280 | 12/1949 | Groves | 137/493.3 |
| 3,441,050 | 4/1969 | Sanchez | 137/493.6 |

Primary Examiner—M. Cary Nelson
Assistant Examiner—Robert J. Miller
Attorney—Christen & Sabol ABSTRACT: A pressure-equalizing valve includes a passage having a first valve seat at one end for cooperation with a longitudinally movable sleeve member, the sleeve having a second valve seat spaced longitudinally from the first valve seat for cooperation with a cup-shaped member in the sleeve; the sleeve and the cup-shaped member being urged into engagement with the respective valve seats by helical springs.

PATENTED DEC 7 1971 3,625,248
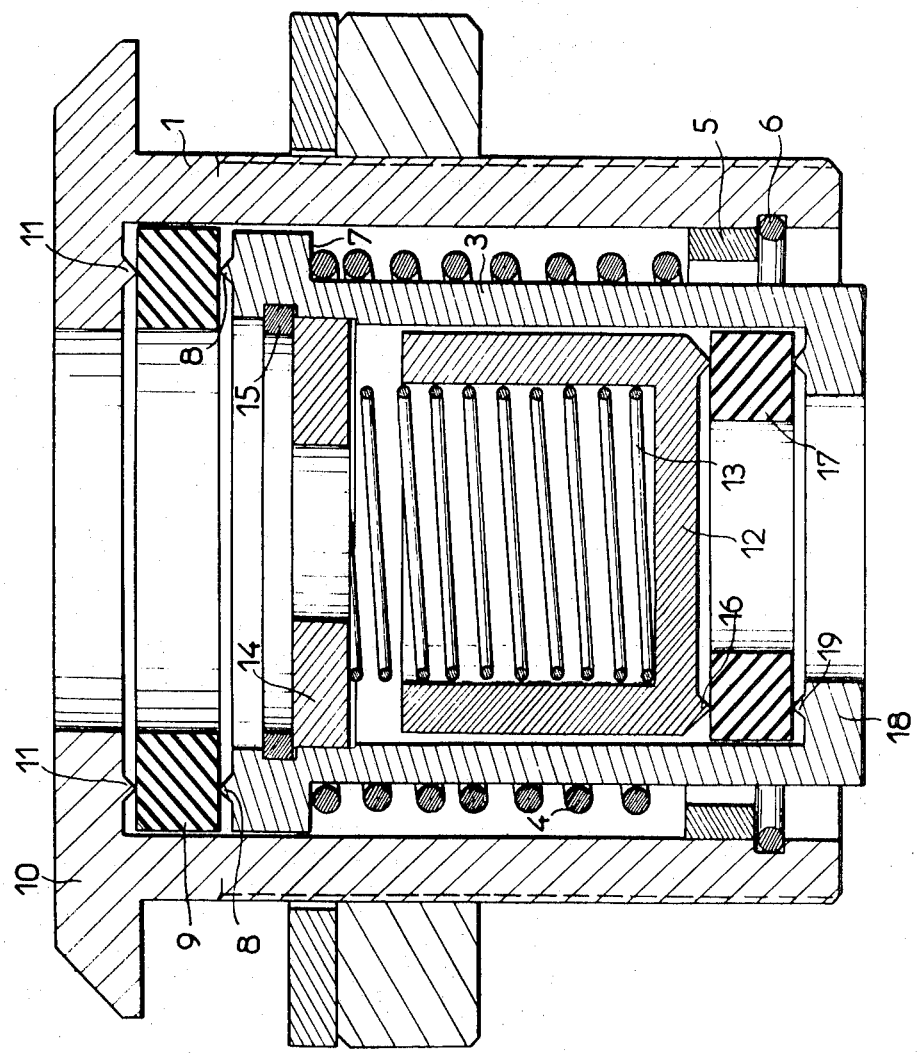

AUTOMATIC PRESSURE-EQUILIBRATING VALVES

This invention relates to improvements in valves chiefly of the automatic type adapted to control the passage of a fluid out of a closed volume or chamber towards the outside or reversely.

The valves more particularly concerned by the invention are intended to provide a balance between the pressure of a closed fluidtight volume or chamber and the pressure prevailing in the outer atmosphere.

Said valves are consequently designed so as to afford a passage for air or the like fluid medium filling the closed chamber towards the outer environment such as the atmosphere as soon as the pressure of the inner medium reaches a predetermined value forming the operative threshold of the valve. This cuts out therefore the building up of an increased pressure inside the closed chamber, which increased pressure might lead to detrimental results either for the products carried or packaged within the chamber or else for the actual chamber which risks being deformed.

Conversely the valves of the type referred to should allow the passage of air or the like fluid from the outer environment towards the inside of the chamber when the external pressure rises above a predetermined threshold.

The threshold of release of double-acting valves in either direction should not be defined as an absolute value. The release and opening of the valve are obtained in fact when the difference between the outer and inner pressures rises above a predetermined limit so that if the pressure increases even to a considerable extent both in the chamber and in the outer environment, the valve remains closed. It is desired in fact to obtain a balance between two pressure levels so that the pressure in the closed chamber remains always within a range defined by a minus and a plus allowance with reference to the pressure of the outer medium.

The valves of the type considered should furthermore ensure perfect fluidtightness for the closed chamber and in particular prevent any undesired introduction of external matter such as liquids or dust which might detrimentally act on the operation of the valve and more particularly damage the products carried in the chamber, which products may be particularly delicate and brittle.

The valves actually on the market do not always satisfy perfectly and reliably such various requirements.

Said valves are generally but not exclusively fitted on rigid and fluidtight packages or containers adapted to enclose brittle articles which may be of a high technical and consequently delicate structure. Said containers are conveyed under often difficult conditions and without any particular care being taken and it is found that the valves now generally used are readily fouled or blocked by the incoming dust entering the gap between the body of the valve and its seat which cuts out any possibility of actual fluidtightness for said valve.

The invention has for its object a valve ensuring in a highly reliable manner an easy operation and adapted to balance the pressures in the fluidtightly closed chamber and in the outer environment.

According to the invention, the valve is constituted by a preferably cylindrical sleeve fluidtightly secured to the body of the closed chamber on the wall of which it is fitted perpendicularly one end of said sleeve opening into the outer environment and the other end opening inside the chamber. The valve includes furthermore a cylinder arranged coaxially with said sleeve and adapted to be shifted longitudinally therein against the action of a helical spring urging one end therein against a yielding annular packing fitted inside one end of the sleeve, said cylinder forming a first elementary valve opening in a single direction when shifted away from said packing while a second elementary valve enclosed within said first elementary valve to allow the fluid to pass in the opposite direction is constituted by a dished member or socket urged by a further spring bearing against one end of the cylinder against an annular packing held fast within the end of the cylinder opposed to that engaging the first-mentioned packing, both springs operating in accurately opposed directions.

According to a further feature of the invention, the packing on which the coaxial cylinder rests on the one hand and the packing carrying the inner dished member on the other hand are made of a silicone elastomer.

According to a still further object of the invention the seat of the first packing constituted by an annular flange of the corresponding end of the sleeve and also the end of the inner cylinder engaging said packing are provided each with an annular rib showing a substantially right-angled cross section, said annular ribs having equal diameters and being located in vertical registry with each other so that the corresponding packing is clamped between the two annular ribs and the contacting areas between the packing and its seat on the one hand and the first elementary valve on the other hand are defined by a line and by no means by a surface.

A similar arrangement serves for the inner dished member provided with an annular rib engaging the corresponding packing which latter is held fast against its seat constituted by an inner flange of the inner cylinder, which is also provided with an annular rib extending underneath the precedingly described rib.

The invention provides thus a double-acting valve which is particularly efficient, durable and reliable.

The use of packings made of silicone elastomer allows the valve to resist high temperatures and more particularly it bestows it with a range of utilization extending over highly different temperatures starting from very low temperatures up to about 200° C.

The ribs clamping the packings on either side thereof also prevent dust or waste material from engaging any gaps between the packings and their seats while they ensure an accurate operation of the valve.

Further features and advantages of the invention will appear from the reading of the following description, reference being made to an embodiment illustrated by way of example in the accompanying drawing, the single FIGURE of which is a longitudinal cross section of said embodiment of our invention.

As illustrated, the valve includes a body or outer casing formed by a sleeve 1 one end of which opens into the outer environment while its other end opens into the closed chamber 2. Said sleeve is provided with means securing it rigidly through a wall of said chamber 2 in a direction perpendicular to said wall.

Inside the sleeve 1 there is arranged coaxially a cylinder 3 open at both ends and adapted to move longitudinally inside the sleeve against the pressure exerted by the coil spring 4 which latter bears against a flange or washer formed or fitted inside the sleeve adjacent its end opening into the chamber 2. Said washer 5 is locked in position inside the sleeve on its side facing the chamber by a circlips 6 fitted in an annular groove formed in the inner surface of the sleeve 1. Said spring 4 urges thus the cylinder 3 outwardly since it engages the latter through its outer flange 7 facing the environment.

Said outer flange 7 is provided along its transverse surface facing the environment with an annular rib 8 the cross section of which in a radial plane is substantially at right angles. Said rib is urged against the packing 9 made of elastomer silicone which packing engages a seat constituted by the inner flange 10 of the end of the sleeve facing the environment which flange is also provided with a rib 11, the shape of which is symmetrical of that of the rib 8, on its side facing away from the latter with reference to a transverse plane of the packing 9.

The first elementary valve thus described allows a fluid such as air to flow from the outer environment towards the inside of the chamber when the external pressure rises by a predetermined threshold value above the value of the pressure in the chamber. The outer excess pressure when thus rising above a predetermined value overcomes the pressure of the coil spring 4 and urges the inner cylinder 3 inwardly so that the external air passing through the opening in the packing 9 may enter the annular space between the cylinder and the sleeve until the inner pressure has reached an increased value such that the pressure exerted by the spring 4 is sufficient for urging the cylinder 3 back against the packing 9 whereby the elementary valve is closed.

The cylinder 3 encloses a secondary element valve facing the chamber and adapted to afford an outer passage for the gasiform fluid inside the latter. To this end, the cylinder 3 encloses a dished member or socket 12 urged downwardly by a coil spring 13 engaging an annular member 14 fitted inside the inner cylinder facing the first-mentioned packing 9. Said annular member 14 is held fast in position by a circlips 15. The lower surface of the bottom closing the dished member 12 is provided with an annular rib 16 similar to the ribs 8 and 11 and resting on the annular packing 17 made of silicone elastomer and engaging in its turn its seat constituted by the inner flange 18 of the sleeve 3, facing the inside of the chamber. Said seat is also provided with an annular rib 19 which is symmetrical of the rib 16 with reference to a transverse plane whereby the packing 17 is clamped between the coaxial annular ribs 16 and 19 which face each other. Said inner elementary valve which has just been described is adapted to resist movement against its spring 13 until a predetermined threshold is reached which allows the air to pass out of the inside of the closed chamber through the openings in the packings 17 and 9, into the outer environment.

It will be readily understood that the accurately gauged valve system described allows the air to pass between the inside and the outside as soon as the difference in pressure in either direction rises above the pressure exerted by the corresponding spring.

Obviously, although it has been assumed that the closed chamber lies underneath the wall 2 in the drawing, the latter can be interpreted as well with the chamber at the top of the drawing.

What I claim is:

1. A valve adapted to afford passage of a fluid in either direction when the difference in pressure between the media located ahead of and before the valve rises beyond a predetermined value, chiefly in order to equilibrate the pressure inside a closed and fluidtight chamber with reference to the outer environment, said valve comprising a preferably cylindrical sleeve secured fluidtightly to the wall of the closed chamber through which it passes perpendicularly, while the ends of said sleeve open respectively into the outer environment and into the chamber, a cylinder coaxially fitted in the sleeve and adapted to move longitudinally therein, a yielding annular packing fitted inside one end of the sleeve so as to form an elementary valve affording a passageway in a single direction, a coil spring urging said cylinder against said packing, and a second elementary valve affording a passage of the fluid in the opposite direction, said second elementary valve including a dished member or socket, a further spring urging said socket and engaging the end of the cylinder facing the first-mentioned packing and urging said socket against another annular packing in floating position in the other end of the cylinder against an annular inwardly projecting rib in the opposite end of the cylinder, the two springs acting in opposed directions.

2. A valve as claimed in claim 1 wherein the packing carrying the coaxial cylinder and also the packing carrying the inner dished member are made of silicone elastomers.

3. A valve as claimed in claim 1 wherein the seat engaged by the first packing and formed by an annular inner flange of the corresponding end of the sleeve and also the transverse annular end of the coaxial cylinder engaging said packing are each provided with an annular rib, the radial cross section of which is substantially at right angles, both of said ribs having the same diameter and being located in vertical registry with each other, the packing being thus clamped between said annular ribs so that the contacting areas between the packing and its seat on the end hand and the valve member on the other hand are defined by a line instead of by a surface.

4. A valve as claimed in claim 1 wherein the closed bottom of the inner dished member is provided with an annular rib engaging the corresponding packing which latter is held fast against the seat constituted by an inner flange formed at the end of the cylinder and also provided with an annular rib registering vertically with the annular rib on the dished member and the cross-sectional shape of which is symmetrical to that of last-mentioned rib with reference to a transverse plane of the packing corresponding thereto.

* * * * *